(12) United States Patent
Chen

(10) Patent No.: US 6,652,048 B2
(45) Date of Patent: Nov. 25, 2003

(54) COMPUTER ENCLOSURE INCORPORATING DRIVE BRACKET

(75) Inventor: Yun Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/041,066

(22) Filed: Dec. 28, 2001

(65) Prior Publication Data

US 2003/0122456 A1 Jul. 3, 2003

(51) Int. Cl.[7] .............................. A47B 97/00; G06F 1/16
(52) U.S. Cl. ..................................... 312/223.2; 361/685
(58) Field of Search .......................... 312/223.1, 223.2, 312/265.1, 265.2, 265.5, 265.6, 257.1; 211/26; 361/724, 725, 726, 727, 683, 685

(56) References Cited

U.S. PATENT DOCUMENTS

| | | | | |
|---|---|---|---|---|
| 5,527,104 A | * | 6/1996 | Moss ................... | 312/223.2 X |
| 5,845,978 A | * | 12/1998 | Jung .................... | 312/223.2 X |
| 6,157,532 A | * | 12/2000 | Cook et al. .......... | 312/223.2 X |
| 6,227,631 B1 | * | 5/2001 | Lin et al. .............. | 312/223.2 |
| 6,381,131 B1 | * | 4/2002 | Liu et al. ............. | 361/685 |
| 6,388,875 B1 | * | 5/2002 | Chen .................... | 312/223.1 X |

FOREIGN PATENT DOCUMENTS

GB 1228231 * 4/1971 .............. 312/223.1

* cited by examiner

Primary Examiner—James O. Hansen
(74) Attorney, Agent, or Firm—Wei Te Chung

(57) ABSTRACT

A computer enclosure includes a cage (5) and a cover (80) attached to the cage. The cage includes a front panel (10) and a side panel (20). The front panel is rearwardly stamped to integrally form a vertical plate (14) opposing the side panel. The side panel is inwardly stamped to integrally form a horizontal plate (22) perpendicular to the front panel. A first flange (24) extends upwardly from a free edge of the horizontal plate, and abuts a bottom portion of the vertical plate. Rivets are extended through the bottom portion of the vertical plate and the first flange to form rivet joints between the vertical plate and the horizontal plate. The combined vertical plate, horizontal plate and the side panel cooperatively constitute a drive bracket. The cover includes a second flange (88) engaging with a top portion of the vertical plate by a rivet joint.

9 Claims, 3 Drawing Sheets

COMPUTER ENCLOSURE INCORPORATING DRIVE BRACKET

BACKGROUND OF THE INVENTION

1. Field of the Invention

The present invention relates to computer enclosures, and particularly to computer enclosures incorporating drive brackets integrally formed with the enclosures.

2. Related Art

Various data storage devices are installed in computers for communication and handling of data. Drive brackets are often used to secure such data storage devices inside the computers.

In a conventional computer, drive brackets are typically formed separately from a computer enclosure. U.S. Pat. No. 5,564,804 discloses a conventional drive bracket for accommodating a data storage device. The data storage device is firstly secured within the drive bracket. The combined drive bracket and data storage device is then slid into a housing of a computer enclosure. U.S. Pat. No. 6,273,273 discloses another conventional drive bracket for accommodating a data storage device. The data storage device is firstly attached to the drive bracket. The combined drive bracket and data storage device is then pivotally attached to a cage of a computer enclosure.

However, in the above-described disclosures, the drive brackets are produced separately from the housing and the cage respectively. Production of the drive brackets requires extra material, thereby unduly inflating costs. Moreover, production and assembly of the corresponding computer enclosures is unduly complicated and time-consuming.

SUMMARY OF THE INVENTION

Accordingly, an object of the present invention is to provide a computer enclosure which has a drive bracket integrally formed with the computer enclosure.

To achieve the above-mentioned object, a computer enclosure in accordance with the present invention comprises a cage and a cover. The cage comprises a front panel and a side panel. The front panel is rearwardly stamped to integrally form a vertical plate opposing the side panel. The side panel is inwardly stamped to integrally form a horizontal plate perpendicular to the front panel. A first flange extends upwardly from a free edge of the horizontal plate, and abuts a bottom portion of the vertical plate. The first flange of the horizontal plate is engaged with the bottom portion of the vertical plate by rivet joints. The combined vertical plate, horizontal plate and the side panel cooperatively constitute a drive bracket. The cover is attached to the cage and covers the drive bracket. The cover comprises a top plate having a second flange depending therefrom. The second flange is engaged with a top portion of the vertical plate by a rivet joint.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
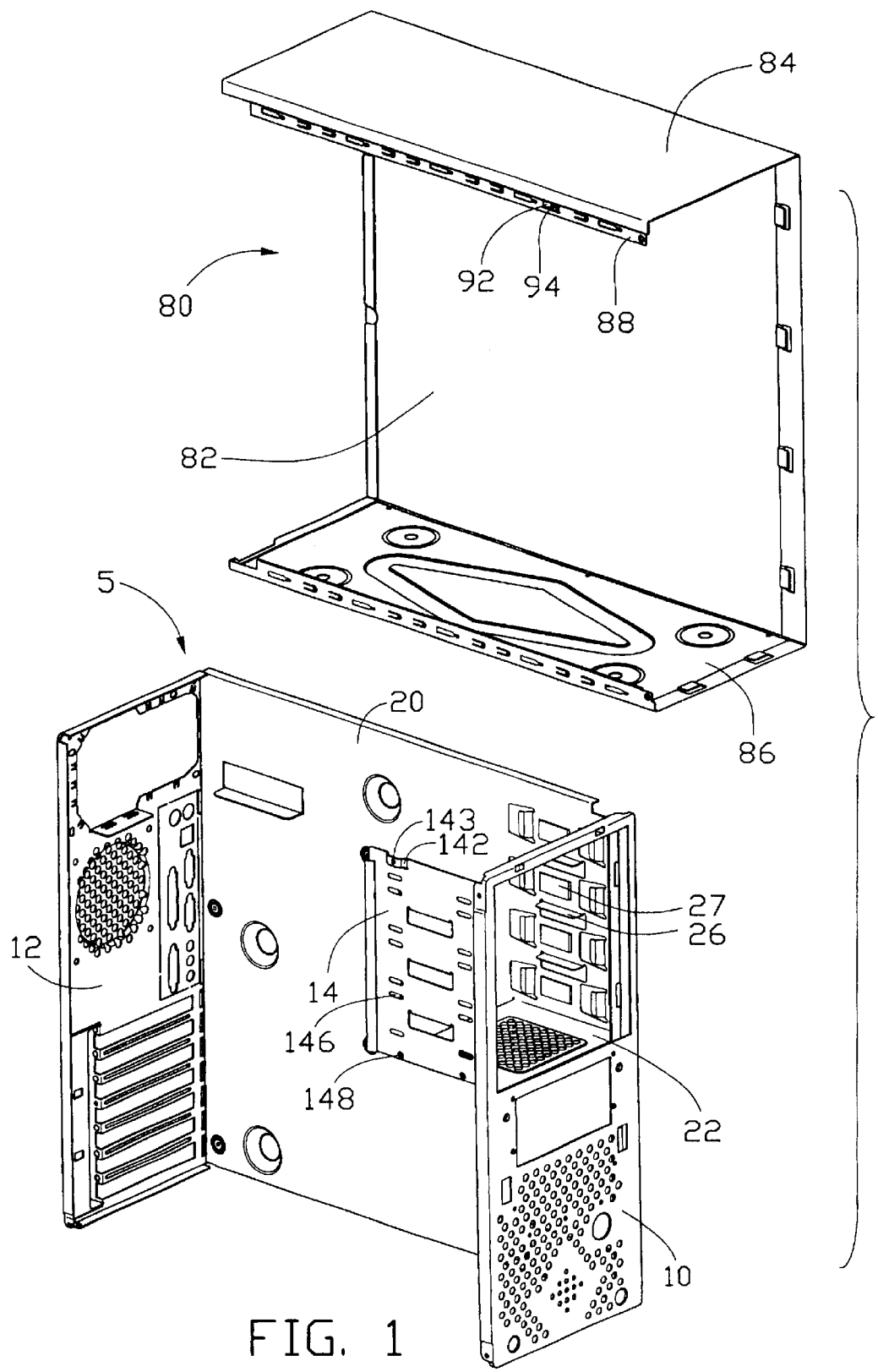
FIG. 1 an exploded view of a computer enclosure in accordance with the present invention.
Figure 2:
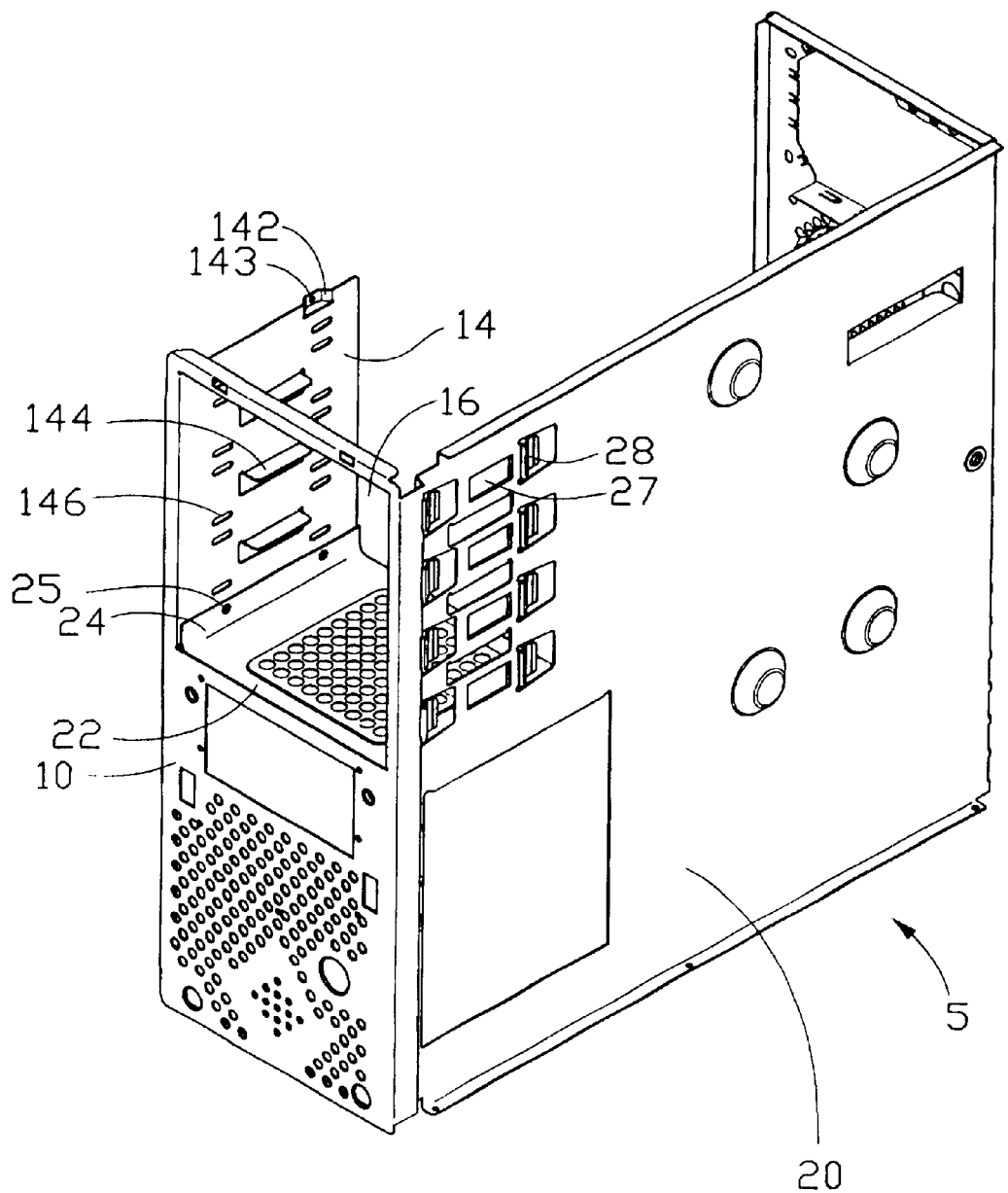
FIG. 2 a perspective view of a cage of the computer enclosure of FIG. 1 but viewed from another aspect.

Referring to FIGS. 1–2, a computer enclosure in accordance with the present invention comprises a cage 5 and a cover 80.

The cage 5 is integrally stamped from a single sheet of metal. The cage 5 comprises a front panel 10, a rear panel 12, and a side panel 20. An upper portion of the front panel 10 is rearwardly stamped to integrally form a rectangular vertical plate 14. The vertical plate 14 is perpendicular to the front panel 10, and parallel to and opposite the side panel 20. A rectangular opening 16 is therefore defined in the upper portion of the front panel 10, for insertion of data storage devices (not shown) therethrough. A top portion of the vertical plate 14 is outwardly stamped to form a retaining protrusion 142. A first through hole 143 is defined in the retaining protrusion 142. A plurality of first supporting tabs 144 is stamped inwardly from a middle portion of the vertical plate 14, one above another. A plurality of locking apertures 146 is defined in the vertical plate 14 on opposite sides of the first supporting tabs 144 respectively, for extensions of screws (not shown) therethrough to engage with the data storage devices. At each side of the first supporting tabs 144, the locking apertures 146 are disposed one above another. A pair of spaced first through apertures 148 is defined in a bottom portion of the vertical plate 14.

A bottom portion of the side panel 20 is stamped inwardly to integrally form a horizontal plate 22. A first flange 24 is bent upwardly from a free edge of the horizontal plate 22 to abut an inside of the bottom portion of the vertical plate 14. A pair of spaced second through apertures 25 is defined in the first flange 24, respectively corresponding to the first through apertures 148. Rivets (not shown) are extended through the first and second through apertures 148, 25 to form rivet joints between the bottom portion of the vertical plate 14 and the horizontal plate 22. The combined horizontal plate 22, vertical plate 14 and side panel 20 cooperatively constitute a drive bracket. The side panel 20 is inwardly stamped to form a plurality of second supporting tabs 26, respectively corresponding to the first supporting tabs 144. The first and second supporting tabs 144, 26 are for supporting the data storage devices thereon. A plurality of projections 27 is formed on an inside of the side panel 20. One of the projections 27 is located above the horizontal plate 22, and the other projections 27 are respectively located above corresponding second supporting tabs 26. Each projection 27 sandwiches one of the data storage devices with the vertical plate 14. A pair of spring tabs 28 is stamped inwardly from the side panel 20 on opposite sides of each projection 27 respectively, for elastically abutting a corresponding data storage device to form grounding paths and absorb vibration.

The cover 80 comprises a top plate 84, a side plate 82, and a bottom plate 86. A second flange 88 depends from the top plate 84 adjacent a longitudinal free edge of the top plate 84. A forward portion of the second flange 88 is inwardly stamped to form a recessed portion 92, corresponding to the retaining protrusion 142 of the cage 5. A second through hole 94 is defined in the recessed portion 92, corresponding to the first through hole 143 of the cage 5.

Figure 3:
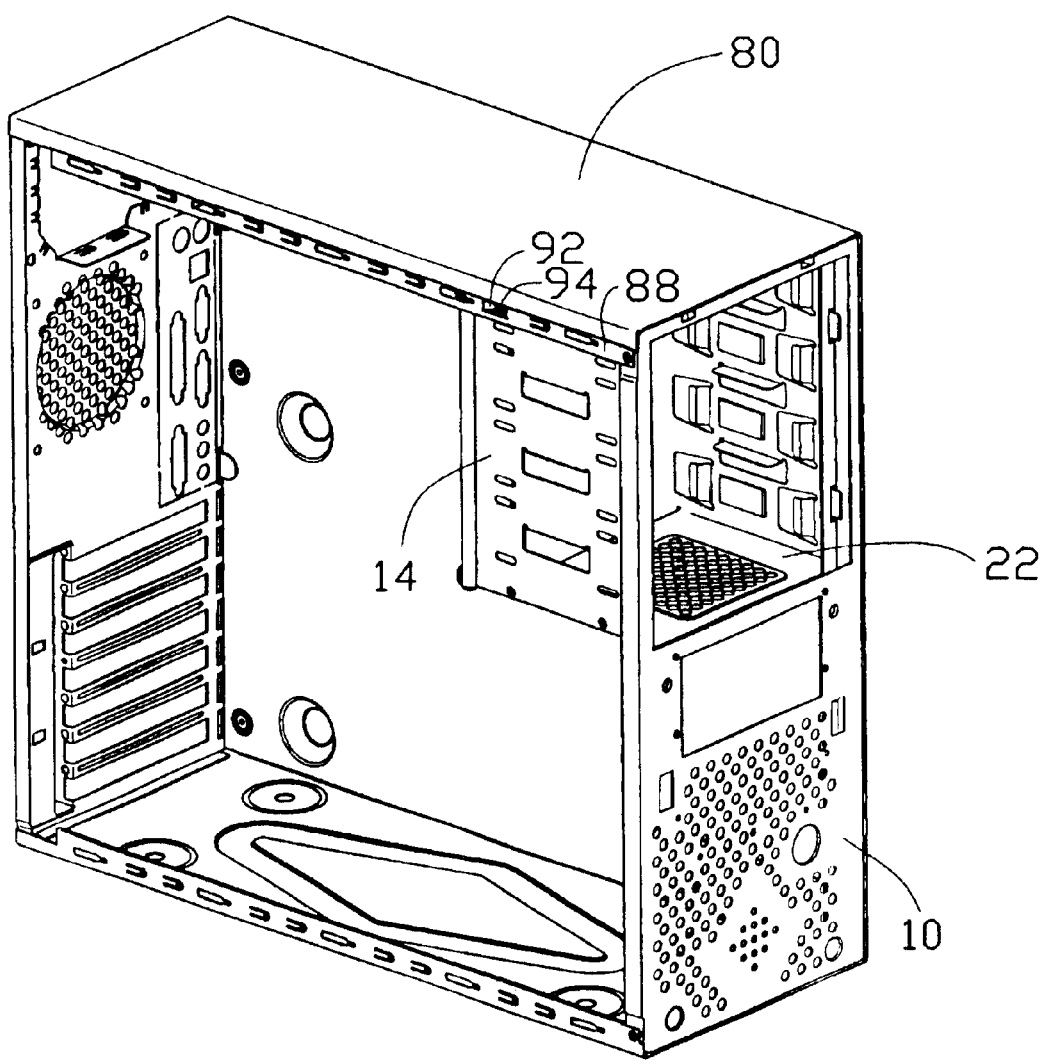
FIG. 3 an assembled view of FIG. 1.

Referring also to FIG. 3, in assembly, the cover 80 is attached to the cage 5 by conventional means. The side plate 82 of the cover 80 abuts against the side panel 20 of the cage 5. The top and bottom plates 84, 86 of the cover 80 are connected between the front and rear panels 10, 12 of the cage 5. The recessed portion 92 of the second flange 88 abuts the retaining protrusion 142 of the vertical plate 14. A rivet (not shown) is extended through the second and first through holes 94, 143 to form a rivet joint between the second flange 88 and the top portion of the vertical plate 14. The computer enclosure is thus completely assembled.

In the present invention, the drive bracket comprises the vertical plate 14 stamped from the front panel 10 of the cage 5, the bottom plate 22 stamped from the side panel 20, and the side panel 20. The drive bracket, being integrally formed from the cage 5, reduces costs. In addition, production and assembly of the computer enclosure is simplified.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:

a cage comprising a front panel and a side panel, the front panel being stamped rearwardly to integrally form a vertical plate opposing the side panel, the side panel being stamped inwardly to integrally form a horizontal plate engaging with the vertical plate, the combined vertical plate, side panel and horizontal plate cooperatively constituting a drive bracket adapted for installing storage devices therein; and a cover attached to the cage and covering the side panel of the cage wherein the vertical plate defines a first through aperture in a bottom portion thereof, a first flange extends upwardly from a free edge of the horizontal plate and abuts the bottom portion of the vertical plate, the first flange defines a second through aperture, and a rivet is extended through the first and second through apertures to form a rivet joint between the bottom portion of the vertical plate and the horizontal plate, and wherein the vertical plate defines a first through hole in a top portion thereof, the cover comprises a top plate and a second flange depending from the top plate, the second flange defines a second through hole, and a rivet is extended through the second and first through holes to form a rivet joint between the top portion of the vertical plate and the second flange.

2. The computer enclosure as claimed in claim 1, wherein the top portion of the vertical plate is stamped outwardly to form a retaining protrusion, the second flange is stamped inwardly to form a recessed portion abutting the retaining protrusion, the first through hole is defined in the retaining protrusion, and the second through hole is defined in the recessed portion.

3. The computer enclosure as claimed in claim 1, wherein the vertical plate and the side panel respectively form a plurality of supporting tabs for supporting data storage devices thereon.

4. The computer enclosure as claim 3, wherein the vertical plate defines a plurality of locking apertures on opposite sides of the supporting tabs for extension of screws therethrough to engage with the storage devices.

5. The computer enclosure as claimed in claim 1, wherein the side panel forms a plurality of projections adapted for sandwiching the storage devices with the vertical plate, and further forms a plurality of spring tabs adapted for abutting against the storage devices to form grounding paths and absorb vibration.

6. A computer enclosure comprising:

a cage having a pair of orthogonal panels, a first plate being integrally stamped inwardly from one panel and opposing the other panel, a second plate being integrally stamped from said other panel and being perpendicular to said one panel, the second plate being perpendicular to and engaging with the first plate;

wherein the combined first plate, second plate and said other panel cooperatively constitute a drive bracket for installing data storage devices in the cage; and a cover fixed to the cage, and covering the drive bracket, wherein the first plate defines a first through aperture in an end portion thereof, a first flange extends perpendicularly from a free edge of the second plate and abuts an inside of said end portion of the first plate, the first flange defines a second through aperture, and a rivet is extended through the first and second through apertures to form a rivet joint between said end portion of the first plate and the second plate, and wherein the first plate defines a first through hole in an opposite end portion thereof, the cover comprises a second flange defining a second through hole, and a rivet is extended through the second and first through holes to form a rivet joint between said opposite end portion of the first plate and the second flange.

7. The computer enclosure as claimed in claim 6, wherein the first plate and said other panel respectively form a plurality of supporting tabs for supporting data storage devices thereon.

8. The computer enclosure as claimed in claim 7, wherein the first plate defines a plurality of locking apertures on opposite sides of the supporting tabs, for extension of screws to engage with the storage devices.

9. The computer enclosure as claimed in claim 6, wherein said other panel forms projections adapted for sandwiching the storage devices with the first plate, and further forms spring tabs adapted for abutting against the storage devices to form grounding paths and absorb vibration.

* * * * *